United States Patent [19]

Perman

[11] 4,078,918
[45] Mar. 14, 1978

[54] METHOD FOR PRECIOUS METAL RECOVERY

[76] Inventor: Craig A. Perman, 4041 Crossway Dr., Waterloo, Iowa 50701

[21] Appl. No.: 745,484

[22] Filed: Nov. 26, 1976

[51] Int. Cl.$^2$ .................. C22B 11/04; C22B 43/00
[52] U.S. Cl. .................................. 75/103; 75/108; 75/118 R; 75/118 P; 75/121
[58] Field of Search ............... 75/108, 118 R, 118 P, 75/121, 103

[56] References Cited

U.S. PATENT DOCUMENTS

| | | | |
|---|---|---|---|
| 3,231,503 | 1/1966 | Lane | 75/118 R |
| 3,458,308 | 7/1969 | Muller | 75/108 |
| 3,725,047 | 4/1973 | Schneider | 75/121 X |
| 3,847,598 | 11/1974 | Coulter et al. | 75/121 R |
| 3,956,088 | 5/1976 | Fassell et al. | 75/101 R |

*Primary Examiner*—G. Ozaki
*Attorney, Agent, or Firm*—Zarley, McKee, Thomte, Voorhess & Sease

[57] ABSTRACT

A recovery process for reclaiming precious metals from industrial process residues, such as silver chloride resulting from salt analysis of meats in a packing plant, or alternatively, from industrial waste photographic papers or the like. The process comprises pretreating the material with an oxidizing agent capable of substantially completely oxidizing organic contaminants, reacting the material with ammonium hydroxide to form a soluble amine complex, and reacting the amine complex with ascorbic acid or a salt form of ascorbic acid to provide precious metal in elemental form. The preferred process is for reclaiming silver.

21 Claims, No Drawings

METHOD FOR PRECIOUS METAL RECOVERY

BACKGROUND OF THE INVENTION

Many industrial processes utilize salt forms of precious metals, especially silver, but also in some instances gold, mercury, palladium, platinum, rhodium, cadmium, lead and the like. For example, with regard to silver, silver nitrate solution is utilized in the meat packing industry in order to determine the sodium chloride content of meat. The silver nitrate solution precipitates the chloride ion and from that is derived a quantitative determination of the amount of salt present in meat products. After the analysis, the silver chloride remains which is contaminated with organic impurities.

In photography, outdated films, unused photographic paper, and many photographic solutions contain sources of silver. Such materials offer a source for reclaiming silver.

Other industrial source materials for reclaiming of silver include impure ores such as cerargyrite, by-product silver from sterling and silver plate manufacture obtained from electrolytes used in the electroplating process, x-ray laboratory materials from hospitals and the like.

In the past both chemical and electrolytic methods have been used to reclaim precious metals from industrial waste streams. Many of the chemical reactions result in a salt compound of the metal which can be filtered out to recover the metal. However, it is then necessary to treat the resulting salt compound in order to recover the free metal. In certain instances this has been done with chemical reducing agents. However, certain undesirable hazards have arisen with most reducing agents in that they are highly toxic and not biodegradable. Thus, while they may perform satisfactorily for reduction of a metal salt from an industrial source, they are undesirable in that they increase the toxicity, non-biodegradability, and pollution level of the factory waste materials. Thus, waste material disposal is complicated, made more expensive, and more hazardous. Often the increased problems of waste disposal far exceed any increased economic advantage of reclaiming precious metals, and thus the metals are not recovered.

Another important feature of a good silver recovery process is the condition including both purity and particle size of the reclaimed silver. If, for example, the silver has a high level of impurities, or is so small in particle size that it will not settle easily, it becomes very difficult to handle and reclaiming costs are increased.

The most commonly used alternative to chemical reclaiming of precious metals is electrolysis. However, in many instances, electrolysis does not do as complete a job of reclaiming as the use of chemical reducing agents and moreover, the initial cost of the equipment in order to complete electrolysis is quite high.

Accordingly, there is a real need for a precious metal recovery process which is substantially cheaper from the standpoint of initial investment than electrolysis recovery, and which is advantageous for industrial usage in that it does not involve increased pollution hazards or increased expense of waste disposal. In addition, there is a need for a process which utilizes only chemical constituents with those chemical constituents being very inexpensive so that the economics of previous metal reclaiming weigh heavily in favor of the reclaiming project.

This invention has as its object the fulfillment of the above described needs. In addition, other objects, which will become apparent from the detailed description which follows below, include at least the following.

A primary object of this invention is to provide a precious metal recovery process which employs a chemical reducing agent, which is inexpensive, non-toxic, does not involve increased pollution hazards, and which can suitably be used for a variety of metal reclaiming processes including recovery from waste materials in a meat packing plant as well as from photographic sources, x-ray laboratories, electroplating processes and many others.

Another object of this invention is to provide a process which minimizes the initial expense for reclaiming of precious metals.

A still further object of this invention is to provide a process which allows nearly complete recovery of all precious metals present in an industrial waste system.

A still further object of this invention is to provide a process of reclaiming precious metals, especially silver, which provides the free metal substantially free from any occluded impurities from the industrial process for which the original metal ion solution was utilized.

Another object is to provide a precious metal recovery process which uses chemicals which can be used by employees without much training in use or handling of the treating agents.

Yet another important object of this invention is to provide for silver or other precious metal recovery by a chemical precipitation process which provides the silver at high purity levels and at a particle size which will settle very easily from solution on standing for a few minutes.

The method of accomplishing these and other objects will become apparent from the detailed description of the invention which follows.

DETAILED DESCRIPTION OF THE INVENTION

Of course, the first procedure in running the process of this invention involves obtaining a source of precious metal ions. The source material is typically in the form of an insoluble metal salt but may also include salt solutions. Typically for silver, the most common source of industrial waste silver, are silver halide salts, such as silver chloride and silver bromide. Gold is often found in the form of impure gold with many occluded impurities, chloride of gold, certain alloys of gold or the like, depending upon the industrial usage from which the waste material came. Platinum often exists in the form of industrial waste platinum solutions resulting from the use of the free metal as a catalyst. The same is true for palladium.

Although the process of this invention has greater applicability then the recovery of silver only, as evidenced by the examples, the remaining portion of this description, for purposes of clarity will be presented with regard to the recovery of silver. It should, however, be understood that what is said for silver also applies to recovery of other precious metals referred to specifically herein.

Depending upon the industrial waste material from which silver is to be reclaimed, the silver may need an initial pre-treatment process in order to oxidize and remove any organic contaminants. For example, silver chloride obtained from the analysis of sodium chloride content in meats, is often contaminated with protein, fat, and other typical meat residues. In this pre-treatment oxidization step, concentrated nitric acid is added to oxidize the organic materials. As a result, the protein which is present is oxidized to amino acids. If desired, one can heat the nitric acid silver chloride mixture in order to speed up the oxidation of the organic material.

In some instances, it has been found desirable in this initial pre-treatment oxidation step in order to heat the mixture a second time along with the addition of a saturated solution of potassium permanganate. The potassium permanganate acts as an additional oxidizing agent which will even further oxidize the remaining amounts of organic matter.

In this initial pretreatment step, the amount of nitric acid or potassium permanganate is not really critical. However, a sufficient amount should be used in order to complete the oxidation of undesired materials.

One of the biggest problems in silvery recovery is precipitation with organic impurities present. The pretreatment eliminates many of these. In addition, the pretreatment is a necessary factor influencing the silver particle size. If pretreatment isn't done a very fine silver particle is formed which is difficult to filter or will not settle out by itself. The silver passes through most filters then clogs the paper. If the pretreatment is done the silver particle size is usually greater than 8 microns and may be filtered and washed easily. It also settles out of the solution on standing in a few minutes.

After the organic materials have been oxidized, and removed, a substantially pure precipitate of silver chloride will remain. If desired, this precipitate may be distilled water washed three or four times in order to remove any possibly interfering ions in order to assure complete silver recovery with little contamination.

Where the starting material is photographic wastes, such as photographic paper or the like, the initial step is to shred the waste material and wash it thoroughly with continual agitation in concentrated ammonium hydroxide. The ammonium hydroxide washing is continued until it is apparent that all of the silver salt in the waste material has been dissolved to form an amine complex. For example, this can be checked by taking a piece of the photographic waste material, if it is in a film material, and placing it in an ascorbic acid developing solution. If it remains clear and does not turn dark, it is apparent that all of the silver chloride has been effectively removed from the material. If it does not remain clear, continual ammonium hydroxide washing should occur.

After the initial pretreatment to remove organic contaminants, where such pretreatment is employed, concentrated ammonium hydroxide is added, preferably in an excess of stoichiometric amount, in order to convert the precious metal salt into an amine complex ion. The result is that the precious metal salt is solubilized to provide a metal amine complex ion.

More efficient results are obtained if the ammonium hydroxide utilized is concentrated ammonium hydroxide, i.e., about 15 molar, however, if desired, one could use more dilute solutions. The concentration is not critical except that a sufficient amount is needed in order to effectively dissolve the precious metal salt. Of course, the more dilute the ammonium hydroxide is, the more difficult it is to dissolve the metal salt and the more difficult remaining steps in the process become because of the large volumes of liquid that one must work with.

This initial solubilization of the precious metal salt can be done conveniently at ambient temperatures and indeed it has been found of no particular advantage to use elevated temperatures. The same is true for pressure. Ambient pressure is entirely satisfactory. It is, however, preferred that the precious metal salt be continually agitated during the addition of the ammonium hydroxide. Desirably agitation is continued until visual inspection revals that all of the precious metal salt has gone into solution.

This solubilization reaction is slightly exothermic but the amount of heat generated is insufficient to cause any particular problems.

If desired, and if it is apparent from a visual inspection that it is needed, the soluble ammonia solution of silver or other precious metals, can be filtered in order to remove any undissolved impurities. Of course, if the particles are extremely coarse, decanting should be utilized as effectively as filtering.

After this process step, the precious metal is now present in the form of a soluble amine complex. It is now ready for reduction with the organic reducing agent employed in this invention.

As heretofore mentioned, in accord with the process of this invention, the soluble amine complex of the precious metal, and particularly silver, is thereafter reacted with an organic reductant, and in particular ascorbic acid or a salt form thereof.

Ascorbic acid, which is an organic reducing agent, has been selected as the reducing agent for the reclaiming process of this invention because of certain unique properties of ascorbic acid. First of all, ascorbic acid is conveniently available without any difficulty. Secondly, ascorbic acid is completely biodegradable. Thirdly, ascorbic acid is very inexpensive. Fourthly, ascorbic acid is non-toxic. Fifthly, ascorbic acid presents absolutely no health or industrial effluent hazards. It should be understood that these reasons are not meant to be the exclusive ones, but only mentioned for illustrative purposes.

From time to time it has been mentioned that the organic reducing agent is ascorbic acid. It should also be understood that it can equally satisfactorily be a salt form of ascorbic acid such as sodium ascorbate, potassium ascorbate, or any other water soluble form of ascorbic acid.

The ascorbic acid can be added to the ammonium hydroxide solution in any convenient manner. It can be added either in dry form or as a water solution. It is preferred that a saturated solution of ascorbic acid be added. The amount of ascorbic acid is at least a stoichiometric amount and preferably is in excess of a stoichiometric amount. It is essential that a stoichiometric amount be added in order to assure that the reduction of all of the precious metal, particularly silver, to the free metal, actually occurs. Preferably during the ascorbic acid solution, the solution is continually agitated. In addition, it is preferred that the ascorbic acid be added as a solution, as opposed to in dry form, since if in excess of the stoichiometric amount is added in dry form, there often will be a precipitate of ascorbic acid along with a reduced free silver. This necessitates yet another separation procedure.

During the addition of the ascorbic acid reducing agent, the free silver begins to separate out almost immediately. The result is that the ascorbic acid, or a salt form thereof, is converted to semi-dehydro-ascorbic acid, the amine complex is destroyed, and the metal ions are reduced to the free metal. The free metal is allowed to settle for a few minutes and thereafter the supernatant liquid can be conveniently decanted. The metal can then be water washed, and dried. If desired, it can be alcohol washed to remove excess water, and thereafter, melted down in a more suitable form for subsequent use.

Applicant has attempted to utilize other organic reducing agents such as hydrolyzed sugar solution and resorcinol, but found that nothing occurred. In addition, oxalic acid was unsuccessfully tried. Formaldehyde appears to work; however, it is expensive, it has a high degree of toxicity, is a gas and is incompatible with ammonia, and produces undesirable by-products. The same is true for other organic reducing agents which theoretically will work to effectuate reduction of metal ions to the free metal, but they are either too expensive, give toxic by-products, are not biodegradable, or are otherwise unsatisfactory.

the following examples are offered to further illustrate but not limit the process of this invention.

EXAMPLE 1

Silver chloride contaminated with meat by-products was obtained from a packing plant. The silver chloride was a residue resulting from salt content determinations of the packing plant meat products. Concentrated nitric acid was added to the contaminated silver chloride and gentle heating occurred. Thereafter, a saturated solution of potassium permanganate was added and gentle heating continued until it appeared visibly that all the organic matter, including protein and fat, had been oxidized. This visible endpoint is shown by the length of time it takes for the purple color to change to a colorless solution. Oxidation may be considered essentially complete if it takes longer than 1 to 2 minutes to turn colorless.

The silver chloride was thereafter water washed and concentrated ammoinium hydroxide (15 molar) was added until it appeared that all of the silver chloride was solubilized. During the addition of ammonium hydroxide, continual agitation in the form of stirring occurred.

A saturated solution of ascorbic acid was added, in excess amounts, and immediately elemental silver precipitated.

EXAMPLE 2

Ten sheets of Kodak single sheet polycontrast rapid paper of 4 by 5 inch size were shredded into small pieces, and weighed. The weight was 24.3 grams. Ammonium hydroxide in concentrated 15 molar form was added to cover the shredded film. The vessel was closed and continually agitated for ten minutes. The solution was decanted and appeared yellow in color. This ammonium hydroxide washing occurred three times for a total wash time of about 30 minutes, and therafter a small strip of paper was removed each time and placed in ascorbic acid in an effort to determine whether or not any silver remained on the shredded paper. Since the paper did not turn dark after the third wash, it became apparent that substantially all of the silver had been effectively removed by the ammonium hydroxide washing.

A saturated solution of ascorbic acid was prepared and added to the solubilized ammonium hydroxide complex with continual addition occurring until it did not appear that any additional amounts of elemental silver were precipitating. The precipitate was filtered, washed, dried and weighed to provide 0.218 grams of elemental silver.

EXAMPLE 3

In an effort to determine the effectiveness of the process of the present invention, quantitative analysis was run utilizing the process of this invention with 18.3 grams of dry silver chloride, obtained from the procedure and source of Example 1. This was dissolved in 190 ml. of concentrated ammonium hydroxide and 54 ml. of ascorbic acid solution, at a concentration of 0.166 grams per ml. was added in order to precipitate the elemental silver. The silver settled quickly indicating larger particle size. The theoretical yield of silver in this example is 13.77 grams. The actual yield determined was 13.1 grams, which provided 95% of the theoretical yield.

EXAMPLE 4

3.7 grams of $Ag_2SO_4$ was dissolved in 500 ml. of warm water. The theoretical yield of Ag. is 2.56 grams and the experimental yield was 2.6 grams.

3.5 grams $Ag_2SO_4$ was dissolved in excess $NH_4OH$ the theoretical yield of Ag. is 2.42 grams, the experimental yield was 2.4 grams. In both cases, an amount in excess of the stoichiometric amount of ascorbic acid was added.

EXAMPLE 5

Mercury nitrate monohydrate was dissolved in water concentrated ammonium hydroxide was added in excess quantities until it was believed that all of the mercury had been converted to a soluble mercury amine complex. Thereafter, a saturated ascorbic acid solution was added with the result being the immediate formation of a silver gray suspension that settled within a few minutes. The particle size was so small that a coalescing agent might be needed in order to make further recovery of the free mercury practical.

EXAMPLE 6

In yet another example, a known sample of gold dissolved in aqua regia was employed. Ammonium hydroxide was carefully added to the aqua regia solution to make it basic pH7 or greater, and thereafter, ascorbic acid was added in excess amounts. Immediately a fine brownish red precipitate of gold appeared. The sample was not weighed or washed or dried.

As can be seen from the previous description, and the above examples, the invention relates to a quick, economical easy to employ and inexpensive process for metal recovery. There are no significantly toxic by-products, and the free metal is recovered in substantial quantities. The invention therefore accomplishes at least all of the objectives stated herein.

EXAMPLE 7

0.411 grams of a palladium on carbon catalyst was obtained. This was reacted with about 5-6 mls. of a 2 to 1 mixture of concentrated nitric and sulfuric acids, respectively, Heated to boiling, cooled and then about 20 mls. of water was added. This mixture was filtered to remove the carbon and recover the $PdSO_4$, a dark orange solution. Excess ascorbic acid was added to this solution with agitation and within 2 minutes a black precipitate of palladium formed. The palladium was filtered and washed, giving 0.060 grams of palladium metal.

What is claimed is:

1. A method of recovering silver, mercury or palladium metals from source materials containing said metals, said method comprising dissolving said source material in ammonium hydroxide to provide metal ions in solution as an amine complex, and reacting said metal ions with ascorbic acid or a salt form thereof to provide said metal in elemental form having a particle size which allows easy separation and recovery of said metal without formation of a dispersion or significant clogging of filter materials.

2. The method of claim 1 wherein said metal is silver.

3. The process of claim 1 wherein said metal source material is an ore and as a first step said ore is size reduced to a fine powder like material.

4. The process of claim 1 wherein said ammonium hydroxide is concentrated ammonium hydroxide.

5. The process of claim 1 wherein said ammonium hydroxide is added in an amount in excess of a stoichiometric amount.

6. The process of claim 1 wherein said source material is continually agitated during the reacting with said ammonium hydroxide.

7. The process of claim 6 wherein agitation continues until all of said precious metal source material has dissolved.

8. The process of claim 7 wherein after said source material has been dissolved in ammonium hydroxide to provide said soluble amine complex, said solution is filtered to remove any undissolved impurities.

9. The process of claim 1 wherein said ascorbic acid is added to said amine complex in dry form.

10. The process of claim 1 wherein said ascorbic acid or salt form thereof is added in an excess of stoichiometric amount.

11. The process of claim 1 wherein said solution is continually agitated during the addition of said ascorbic acid or salt form thereof.

12. The process of claim 1 wherein a final step includes separating and drying said elemental metal.

13. A method of recovering precious metals and mercury from precious metal, and mercury source materials, said method comprising pre-treating said source material with an oxidizing agent which is capable of substantially completely oxidizing any organic contaminants which might be present with said source material, reacting said source material with ammonium hydroxide to form a soluble amine complex of said precious metal, and reacting said amine complex with ascorbic acid or a salt form thereof to provide said precious metal in elemental form and of a particle size which allows easy separation of said metal without formation of a dispersion or significant clogging of filter materials.

14. The method of claim 13 wherein said metal is selected from the group consisting of silver, mercury, and palladium.

15. The method of claim 13 wherein said metal is silver.

16. The process of claim 13 wherein in said pretreating step a saturated solution of potassium permanganate is added to further oxidize said organic contaminants, the particle size of said elemental metal being usually greater than 8 microns.

17. The process of claim 13 wherein said oxidizing agent is concentrated nitric acid.

18. The process of claim 13 wherein said ascorbic acid or salt form thereof is added as a saturated solution.

19. The process of claim 13 wherein a final step includes separating and washing and drying said elemental metal.

20. A method of recovering free silver from organic matter contaminated silver chloride residue resulting from sodium chloride content analysis of meat products, said method comprising, adding nitric acid to said silver chloride residue to oxidize organic contaminants of said meat products, heating said nitric acid silver chloride mixture and adding saturated potassium permanganate solution to provide for further oxidation of organic contaminants, separating and washing said silver chloride, reacting said silver chloride with ammonium hydroxide to form a soluble silver amine complex, and reacting said silver amine complex with ascorbic acid or a salt form thereof to provide elemental silver having a particle size which allows easy separation and recovery of said silver without formation of a dispersion or significant clogging of filler materials.

21. A method of recovering free silver from photographic paper and like materials, said method comprising, shredding said photographic materials, washing said shredded materials with ammonium hydroxide solution, separating said washing solution from said shredded materials, adding excess ascorbic acid, or a salt form thereof, to said washing solution to provide a precipitate of free silver having a particle size which allows easy separation and recovery of said silver without formation of a dispersion or significant clogging of filter materials.

* * * * *